H. E. HOYLE.
POULTRY WATERING DEVICE.
APPLICATION FILED DEC. 29, 1913.

1,114,264.

Patented Oct. 20, 1914.

Howard E. Hoyle, Inventor,

Witnesses
F. B. Wooden.
M. C. Lucas.

By Milo _____
Attorney

UNITED STATES PATENT OFFICE.

HOWARD ELWOOD HOYLE, OF WHITTIER, IOWA.

POULTRY-WATERING DEVICE.

1,114,264.

Specification of Letters Patent. Patented Oct. 20, 1914.

Application filed December 29, 1913. Serial No. 809,388.

*To all whom it may concern:*

Be it known that I, HOWARD E. HOYLE, a citizen of the United States, residing at Whittier, in the county of Linn and State of Iowa, have invented certain new and useful Improvements in Poultry-Watering Devices, of which the following is a specification.

The watering device which is the subject matter of the present application for patent is designed to prevent ducks from splashing water around the vessel in which they bathe, the vessel being provided with a novel catch basin and guard, as will be described in detail hereinafter.

In order that the invention may be better understood, reference is had to the accompanying drawing, in which—

Figure 1:
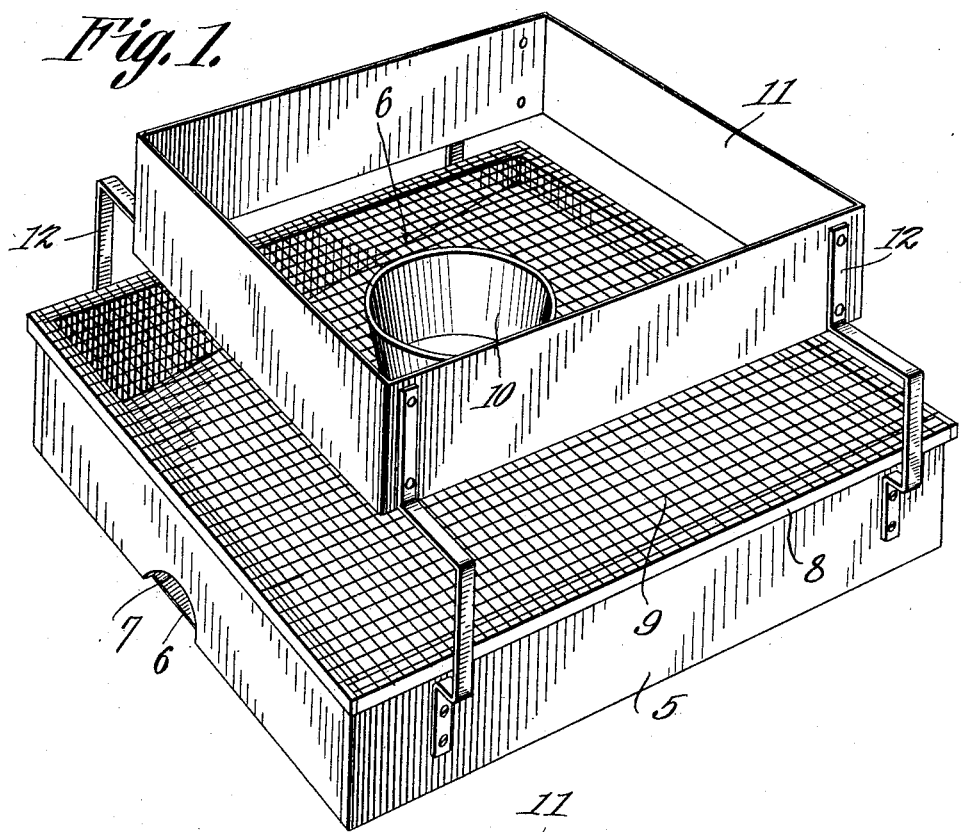
Figure 2:
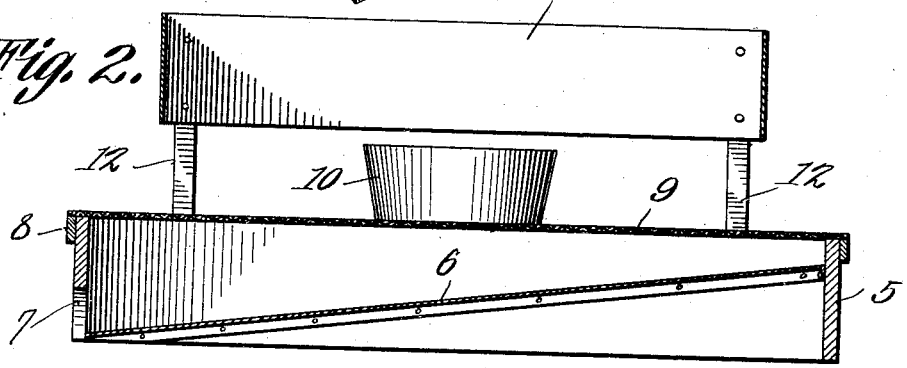

Figure 1 is a perspective view of the device, and Fig. 2 is a cross-section thereof.

Referring specifically to the drawing, 5 denotes an open rectangular wooden frame of any suitable dimensions, in which is mounted a galvanized sheet iron plate 6 entirely filling the same and sloping down to an opening 7 in one side of the frame. On the top edge of the frame 5 is loosely fitted a frame 8 carrying a wire screen 9 which covers the top of the frame 5. The water vessel 10 used by the ducks seats on top of the screen 9. Any water splashed out of the vessel by the ducks drops through the screen 9 onto the plate 6 and runs down the same and is carried off through the opening 7. The vessel 10 is surrounded by a galvanized sheet iron shield or guard 11 held in vertical position by braces or supports 12, which latter are secured to the frame 5 and rise above the same a distance to space the shield from the top of said frame and the screen 9, the spacing being sufficient to allow the ducks to pass under the shield to the vessel. The braces or supports 12 are offset outward of the frame 5 to clear the top thereof in order to allow the screen 9 to be removed, and said braces or supports are on two opposite sides of the frame 5 only, leaving the other sides free to permit the screen to be slipped out. The shield is somewhat smaller in circumference than the frame 5. The purpose of the shield 11 is to stop or catch the water which the ducks sling from their heads and bodies, the same striking the shield and dripping down onto the plate 6, which thus serves as a catch-basin and carries the water to the opening 7 as hereinbefore described.

The device can easily be kept clean as the screen 9 is removable, leaving the plate 6 accessible, and by the use of the device the ducks are prevented from splashing water around their quarters and getting the same wet and filthy.

The preferred embodiment of the invention has been shown, but it is to be understood that various changes and modifications in the structural details illustrated and described hereinbefore may be made without departure from the spirit and scope of the invention as claimed hereinafter.

I claim:

1. A watering device comprising an open frame, a screen mounted over the top of the frame to support a water vessel, and an inclosing shield carried by the frame, said shield being spaced at the bottom from the top of the frame.

2. A watering device comprising an open frame, a screen removably mounted over the top of the frame to support a water vessel, an inclosing shield spaced at the bottom from the top of the frame, and supports for the shield carried by the frame, said shield supports being located on opposite sides of the frame and offset outward therefrom.

3. A watering device comprising an open frame, a catch-basin inside the frame, a support for a water vessel mounted over the top of the frame, and an inclosing shield carried by the frame, said shield being spaced at the bottom from the top of the frame.

4. A watering device comprising an open frame, a catch-basin inside the frame, a support for a water vessel removably mounted over the top of the frame, an inclosing shield spaced at the bottom from the top of the frame, and supports for the shield carried by the frame, said shield supports being located on opposite sides of the frame and offset outward therefrom.

5. A watering device comprising an open frame, a catch-basin inside the frame, a screen removably mounted over the top of the frame to support a water vessel, an inclosing shield spaced at the bottom from the top of the frame, and supports for the shield carried by the frame, said shield supports being located on opposite sides of the frame and offset outward therefrom.

6. A watering device comprising an open frame, a support for a water vessel mounted over the top of the frame, and an inclosing shield carried by the frame, said shield being spaced at the bottom from the top of the frame.

7. A watering device comprising an open frame, a support for a water vessel removably mounted over the top of the frame, an inclosing shield spaced at the bottom from the top of the frame, and supports for the shield carried by the frame, said shield supports being located on opposite sides of the frame and offset outward therefrom.

In testimony whereof I affix my signature in presence of two witnesses.

HOWARD ELWOOD HOYLE.

Witnesses:
W. P. CALVERT,
H. R. SMITH.

Copies of this patent may be obtained for five cents each, by addressing the "Commissioner of Patents, Washington, D. C."